United States Patent [19]

Singh et al.

[11] 4,005,057
[45] Jan. 25, 1977

[54] ANTISTATIC COMPOSITION CONTAINING AN N-ALKYL POLYCARBONAMIDE AND A PHOSPHONIUM SALT

[75] Inventors: Gurdial Singh, Hockessin, Del.; Richard Edward von Rutte, Riehen-Basel, Switzerland

[73] Assignee: E. I. Du Pont de Nemours and Company, Wilmington, Del.

[22] Filed: Sept. 17, 1975

[21] Appl. No.: 614,230

Related U.S. Application Data

[63] Continuation-in-part of Ser. No. 403,334, Oct. 9, 1973, abandoned.

[52] U.S. Cl. .................. 260/78 S; 260/45.7 PS; 260/45.7 P; 260/75 T; 260/75 P; 260/75 S; 260/78 SC; 260/DIG. 16; 260/DIG. 19; 260/DIG. 21; 428/373
[51] Int. Cl.² ............................... C08G 69/46
[58] Field of Search ............ 260/45.7 PS, 45.7 P, 260/DIG. 16, DIG. 19, DIG. 21, 78 S

[56] References Cited

UNITED STATES PATENTS

| | | | |
|---|---|---|---|
| 3,496,147 | 2/1970 | Cubbon | 260/78 S |
| 3,514,498 | 5/1970 | Okazaki et al. | 260/78 S X |
| 3,637,552 | 1/1972 | Bryan | 260/45.7 P X |
| 3,732,183 | 5/1973 | Popp et al. | 260/75 P |

FOREIGN PATENTS OR APPLICATIONS

4,222,334  6/1972  Japan

*Primary Examiner*—Murray Tillman
*Assistant Examiner*—W. C. Danison, Jr.

[57] ABSTRACT

Conductive compositions useful in imparting antistatic properties in filaments and other articles are provided, which comprise N-alkyl polycarbonamides, polyesters or polyetheresters having a Tg (NMR) less than 25° C and from 0.02 to 35 weight percent of a phosphonium salt of a phosphonate, phosphinate, or sulfonate.

4 Claims, No Drawings

ANTISTATIC COMPOSITION CONTAINING AN N-ALKYL POLYCARBONAMIDE AND A PHOSPHONIUM SALT

CROSS-REFERENCE TO RELATED APPLICATION

This application is a continuation-in-part of application Ser. No. 403,334, filed Oct. 9, 1973, now abandoned.

BACKGROUND OF THE INVENTION

The use of ionic compounds to improve the antistatic performance of polyethers employed as antistatic agents in synthetic fiber-forming polymers is known as shown for example in U.S. Pat. No. 3,514,498 and British Pat. No. 1,179,266. The use of phosphonium bromides or alkyl phosphonium phosphates and polyethers in fiber-forming polymers for improved antistatic property is shown in U.S. Pat. No. 3,696,078 and U.S. Pat. No. 3,637,552 respectively. U.S. Pat. No. 3,732,183 discloses that polyesters having linkages containing phosphonium sulfonate groups have improved antistatic properties. New compositions useful for imparting antistatic properties to fibers and having certain advantages in cost, or stability during fiber spinning or during fiber use has been a desirable objective.

SUMMARY OF THE INVENTION

The present invention provides an antistatic composition consisting essentially of a conductive polymer selected from the group consisting of an N-alkyl polycarbonamide, a polyetherester and a polyester, having a Tg(NMR) of less than 25° C and from 0.02 to 35 weight percent based on the weight of the composition, of a phosphonium salt of the formula:

where $R_1$, $R_2$, $R_3$ and $R_4$, which may be the same or different, each represents a monovalent hydrocarbon group of from 1 to 18 carbon atoms; and $X^{n-}$ is an organic anion selected from the group of

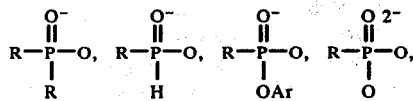

and $R{-}(SO_3^-)_m$ and
wherein Ar is an aromatic hydrocarbon radical; R is an aliphatic or an aromatic hydrocarbon radical $m$ is 1 or 2 and $n$, the valence of the anion, is 1 or 2. Preferably Ar is a phenyl group and R is an aromatic hydrocarbon radical. More preferably, Ar and R are phenyl.

A filament having antistatic properties is prepared from a blend of from 2 to 12 percent by weight of the antistatic composition of this invention and a fiber-forming synthetic polymer or the antistatic composition may be used as the core occupying from 0.1 to 50, preferably 2 to 10% of the cross-sectional area of a sheath-core bicomponent fiber with a fiber-forming synthetic polymer as the sheath. Preferably the filament will be a sheath-core filament with the polymer of the sheath having a high order of hydrophobicity and the core being an N-alkylpolycarbonamide containing a phosphonium arylsulfonate.

DETAILED DESCRIPTION OF THE INVENTION

The antistatic compositions of this invention have a log $R_s$ as defined below, of less than 8 and comprise a member of a selected class of conductive polymers having a glass transition temperature as determined by its nuclear magnetic resonance peak ratio, herein called Tg (NMR), less than 25° C and from about 0.02 to 35 weight percent, preferably 1 to 10 weight percent, based on the weight of the composition of designated phosphonium salts.

The phosphonium salts used in the present invention have the formula $[R_1R_2R_3R_4P^+]_nX^{n-}$. Single salts or mixtures of salts may be used. In the formula, $R_1$, $R_2$, $R_3$ and $R_4$ are each attached to the phosphorus atom and are monovalent hydrocarbon radicals of from 1 to 18 carbon atoms. It is preferred that $R_1$, $R_2$, $R_3$ and $R_4$ be alkyl groups of 4 to 12, more preferably 4 to 8 carbon atoms each. $X^{n-}$ represents an organic anion that is a phosphinate, phosphonate, or sulfonate. Preferably $X^{n-}$ is a monovalent aromatic sulfonate.

The phosphonium salts are highly effective in improving the electrical conductivity of the N-alkyl polycarbonamides, polyetheresters and polyesters of the present invention. In addition, they are sufficiently thermally stable to permit normal processing of polymers in which they are used, for example melt-spinning operations.

As suitable phosphonium salts for use in this invention there may be mentioned tetrabutylphosphonium diphenylphosphinate, tetrabutylphosphonium phenylphosphinate, methyltributylphosphonium xylenesulfonate, tetrabutylphosphonium benzenesulfonate, methyltricyclohexylphosphonium xylenesulfonate, benzyltriphenylphosphonium xylenesulfonate, tetraoctylphosphonium phenylphosphinate, di(methyltribenzylphosphonium) phenylphosphonate, and tetra-n-butylphosphonium phenyl phenylphosphonate.

For a significant improvement in conductivity the phosphonium salt should be present in the conductive polymer at a concentration of at least 0.02 weight percent based on the weight of the composition. Normally, no more than about 35 weight percent will be required to provide a composition having a log $R_s$ of less than 8.

The organic phosphonium salts are conveniently prepared by known reactions from known compounds, generally by metathesis reactions involving ion exchange to obtain the desired anion. For example, one may react in aqueous medium, a phosphonium halide with an alkali metal sulfonate and separate the phosphonium sulfonate from the aqueous medium. The alkali metal sulfonates are commercially available or readily prepared.

The conductive polymers to which the salts are added in accordance with the present invention are amorphous and non-fiber-forming and have a fluid-like mobility at normal ambient temperatures as reflected by glass transition temperature as determined by nuclear magnetic resonance peak ratio, herein called Tg (NMR), less than 25° C. Such glass transition temperatures can be approximated by using less complicated techniques such as differential thermal analysis for convenience. Such polymers are readily and permanently deformable when stressed and vary in their physical nature from rubbery compositions to liquids and low melting solids and accordingly they are not suitable for forming useful textile filaments by themselves. For processibility reasons in the production of sheath/core filaments, it is desirable that the polymers of this invention have a viscosity of at least 10 centipoises at the filament spinning temperature to be employed which is commonly above 250° C, and more desirably a viscosity of at least 100 centipoises. Their melt viscosity can be controlled by molecular weight and by the use of branching or cross-linking agents.

The conductive polymers to be modified in accordance with the present invention are characterized by having a log $R_s$ of about 7 to 11 and are selected from the group of N-alkyl polycarbonamides, polyetheresters (by which is meant polyesters of polyethers) and polyesters.

Suitable polyether-esters are disclosed in Br. Pat. No. 1,176,648 and U.S. Pat. No. 3,655,821 and additional polyether-ester compositions are disclosed in the examples of this invention. Preferably the polyether-ester will be prepared from a polyether glycol having a molecular weight from about 200 to about 2000 and at least one dibasic acid that is a saturated aliphatic dibasic acid having at least 9, preferably 9 to 12, carbon atoms or an aromatic diacid such as terephthalic or isophthalic acid or ester-forming derivative.

Suitable N-alkyl polycarbonamides contain tertiary amide groups as an integral part of the polymer chain. These materials are described in Br. Pat. No. 1,237,589 and in U.S. application Ser. No. 388,137, filed Aug. 14, 1973 to Alderson, now U.S. Pat. No. 3,900,676. They may be homopolymers or copolymers from N-alkyl and N,N'-dialkyl-substituted diamines or N-alkyl aminocarboxylic acids. The copolymers may contain minor amounts of unsubstituted amines. At least 35%, preferably 50%, of the polymer-chain amide linkages should be N-substituted with an alkyl group. Suitable alkyl groups are those containing from 1 to 18, preferably 2 to 10 carbon atoms, and cycloalkyl groups containing 3 to 8, preferably 5 or 6, carbon atoms. Normally, the N-alkyl polycarbonamide copolymer should contain no more than about 15 mole percent of amide groups from a nonsubstituted, diprimary diamine. Higher concentrations of such diamines tend to reduce to an unsatisfactory degree the antistatic effectiveness of the polymer. Suitable N-substituted diamines are the N-mono- and N,N-disubstituted diamines containing from about 2 to 18 and preferably, 2 to 12 carbon atoms in the alkylene group and include N,N'-diethyl-, diisobutyl-, -di-n-butyl-, -dihexyl-, -diheptyl-, -didecyl- and -distearyl- ethylene, propylene, tetramethylene, hexamethylene, nonamethylene and decamethylene diamines as well as the mono-N-alkyl derivatives of these diamines. Suitable aliphatic dicarboxylic acids are those containing from about 1 to 18, preferably, 4 to 12 carbon atoms in the alkylene and include succinic, glutaric, adipic, pimelic, suberic, azelaic, sebacic, dodecanedioic and higher dicarboxylic acids and also such acids as N-N'-bis($\omega$-carboxyalkyl)piperazine.

Some suitable N-alkyl amino-carboxylic acids, or their amide-forming derivatives, which can be used to prepare suitable N-alkyl polycarbonamides for this invention are N-methyl-, -ethyl-, isobutyl-, -n-butyl-, -hexyl-, -decyl-, etc., 11-aminostearic and $\omega$-aminostearic acids.

Suitable polyesters are prepared from aliphatic glycols having 2 to 8 carbon atoms and aliphatic dibasic acids, or their ester-forming derivatives, having 4 to 36 carbon atoms. Aromatic dibasic acids, or their ester-forming derivatives, may be used in small amounts with the aliphatic dibasic acids provided that the amount used does not raise the log $R_s$ to above 11. The use of branched-chain glycols and the use of more than one glycol reduce the propensity for crystallization to occur and thus permit the use of larger amounts of aromatic dibasic acids. As suitable reactants for preparing these polyesters there may be mentioned ethylene glycol, 1,3-propanediol; 1,4-butanediol; 1,6-hexanediol; 2,2-dimethyl-1,3-propanediol; 2-methyl-2-ethyl-1,3-propanediol; 2,2-diethyl-1,3-propanediol; 2-methyl-2-propyl-1,3-propanediol; 2,2,4-trimethylhexanediol; 2,4,4-trimethylhexanediol; glutaric acid, succinic acid, adipic acid, azelaic acid, dodecanedioic acid, and terephthalic acid and their ester-forming derivatives.

Branching agents, i.e., polymer reactants having more than two functional groups may be added when it is desired to increase the viscosity of the antistatic polymers. As suitable branching agents there may be mentioned pyromellitic dianhydride, trimethylol propane, pentaerythritol and bis(hexamethylene)triamine.

The phosphonium salts may be incorporated into the antistatic polymers by any convenient means such as by mixing either from solution or, preferably, directly with the polymer in a fluid state, or it may conveniently be incorporated during the polymerization of the polymer.

An antistatic filament produced in accordance with this invention may have the conductive polymer composition dispersed as known in the art as minute particles distributed throughout the body of filament or as a continuous core throughout the length of a filament. The latter method makes maximum use of the improved conductivity since the conductive system is continuous and antistatic behavior is essentially independent of the surrounding matrix.

Synthetic, fiber-forming polymers which can be made antistatic by the compositions of this invention include polymers and copolymers from the classes of polyamides, polyesters and polyolefins.

TESTS AND MEASUREMENTS

The specific resistance, $R_s$, is determined at room temperature on the dry (water-free) polymer. The polymer is dried at 100° C. in an oven at a pressure less than 50 torr for at least 12 hours. More stringent drying conditions are usually not required but may be used when convenient. The cell used for the measurements consists of a "Pyrex" glass tube of $2 \pm 0.25$ millimeter inside diameter and 8 millimeters outside diameter. It is filled with the sample. Copper electrodes are inserted through rubber end-caps at each end of the tube with 33 centimeter electrode separation and the current transmitted through the sample at a potential difference of 220 volts DC is recorded using a Beckman Vibrating Reed Model 1051 microammeter. Specific resistance is calculated from the equation:

$$R_s \text{ (ohms)} = K_c/I \text{ (amps)}$$

The cell constant, $K_c$, is determined with a liquid of known specific resistance in ohm-cm. The values reported herein used $7.63 \times 10^{-2}$ as the cell constant. For convenience the $R_s$ value is reported as its $\log_{10}$ value. The lower the $R_s$ value, the higher is the conductivity of the sample.

The static propensity of antistatic filaments reported herein is determined on fabric made with them.

The filaments may be converted into woven fabric, and the static propensity determined by measuring the amount of direct current that passes through the fabric at a temperature of 22° C. and 26% relative humidity. In order to assure electrical contact between the electrode and the core-containing filaments of the fabric, it may be desirable to paint the fabric with an electrically conductive paint in the area of electrode contact. In the examples below, no conductive paint is used unless it is specifically mentioned. The ohms per square unit of area of fabric surface is determined according to the AATCC Method, 76–59 ("Technical Manual of the AATCC", Volume 41, 1965, pages B-188). This value, given as log R, is the logarithm to the base 10 of the fabric resistance in ohms. Higher values indicate a greater tendency to acquire and retain an electrostatic charge. This method provides an approximate measure of static propensity. However, to compare filaments one should determine the log rho of the filaments, which takes into account differences in total yarn cross-section, and is obtained from the expression:

$$\log \text{rho (filament)} = \log R \text{ (fabric)} - \log (9 \times 10^5 D) + \log (Pd)$$

where D is the density of the fiber-forming polymer, P is the number of picks (yarn ends) per centimeter in the fabric and d is the total denier of each pick. In the examples, the following values of D are used: 1.15 for 66 polyamide and 1.0 for the polyamide from bis(4-aminocyclohexyl)methane and 12-acid.

The (Pd) value, which gives the amount of yarn in the fabric, is multiplied by the fraction of the conductive filaments in a yarn bundle to obtain the log rho reported for the conductive filaments. When only conductive filaments are present the fraction is one.

Fibers which produce a log rho value of 11 or less are considered to have antistatic properties with the lower values again representing the more desirable antistatic properties.

Fabrics are given a number of "home" wash-dry cycles in a tumble washing machine with a synthetic detergent in water at 38° C., spun-dried, and tumble-dried at 77° C. These cycles are referred to as "C" washes.

For carpets, the static propensity of the antistatic filaments can be determined by using the filaments to make a carpet and measuring the electrostatic voltage built up on a person walking upon a section of the carpet at 21° C. and 20% relative humidity. Filaments used in this measurement, referred to as the shuffle test, preferably should provide voltages less than 2KV. The procedure for the shuffle test is described in AATCC Test Method 134—1964 with changes adopted by the Carpet & Rug Institute, September, 1971.

The $T_g$ (NMR) is the temperature above which there is a rapid rise in the NMR narrow peak and peak ratio with an increase in temperature. The NMR peak ratio is determined from the NMR broadline spectrum measured at a given temperature on the dry polymer (e.g. dried at 125° C. for at least 15 minutes in dry nitrogen) in an atmosphere of dry nitrogen using a radio frequency of 56.4 megacycles at an attenuation setting of 17 decibels with a sweep modulation amplitude of one gauss. The NMR spectrum is measured using the nuclear magnetic resonance equipment of Varian Associates, Model V — 4302 Dual Purpose Spectrometer and their high temperature probe insert, Model No. V — 4331 TWL. The NMR spectrogram at a given temperature shows a broad absorption "hump" upon which is superimposed a vary narrow peak. The derivative curve of the spectrogram is recorded by the spectrometer; "peak ratio" measurements are made on this curve. The height of the narrow peak divided by the height of the "hump" gives the "peak ratio", as described in J. Polymer Science Part C, Polymer Symposia, No. 3, pp. 3–8 (1963). The precision of this peak ratio determination is about ± 0.2 and that of the $T_g$ (NMR), ± 5° C. The phosphonium sulfonate modified N-alkyl polyamides, aliphatic polyesters and polyether-esters of the invention have $T_g$ (NMR) of less than 25° C. as is also evidenced by their fluid-like, rubber-like or gummy nature.

The % core in the filament is the % of the cross-sectional area of the filament occupied by the core material. The cross-sectional area is conveniently determined by photographing a cross-section of the filament under a microscope at 50 to 1500X and determining the % core from measurement of the photograph. In the case of irregularities, the average of 5 to 10 determinations is used. For round filaments with round cores, the % core can also be determined by photographing the filaments in a longitudinal view immersed in a medium having a refractive index closely matching the refractive index of the filament, and measuring the filament and the core diameters and calculating the % core.

The expression "relative viscosity" as used herein signifies the ratio of the flow time in a viscometer of a polymer solution relative to the flow time of the solvent by itself measured in the same units at 25° C. Unless otherwise specified the relative viscosity of the polyamides is determined using an 8.4%, by weight, based on total weight, solution in 90% by weight, based on total weight, aqueous formic acid.

Inherent viscosity, $\eta$inh, is determined from the expression:

$$\eta \text{inh} = \log_e \eta / C$$

where $\eta$ is the viscosity of a dilute solution of the polymer in m-cresol divided by the viscosity of m-cresol in the same units and at the same temperature and C is the concentration of the dilute solution in grams of polymer per 100 ml. of solution. In the examples, the temperature used is 25° C. and the value of C is 0.5.

In the procedures and examples that follow, all percentages are by weight, based on total weight, unless indicated otherwise and all determinations of the physical nature of the conductive polymer are made at a temperature of about 25° C. except as specifically noted.

PREPARATION OF PHOSPHONIUM SALTS

Tetra-n-butylphosphonium Phenylphosphinate

A solution of 147.5 grams of tetra-n-butylphosphonium chloride in 1 liter of 2B alcohol is stirred in a 3-liter round-bottom flask fitted with a reflux condenser and a heating mantle. To it is added a solution of 90 grams of potassium phenylphosphinate in 500 ml of 2B alcohol. A white precipitate separates immediately. The mixture is refluxed for 2 hours and is then cooled to room temperature, and is filtered. Solvent is removed from the filtrate with a rotatory evaporator. The phosphonium salt remains behind as an oil.

Tetra-n-butylphosphonium Diphenylphosphinate

To a suspension of 43.6 grams of diphenylphosphinic acid in 300 milliliters of distilled water is added a solution of 8.0 grams of sodium hydroxide in 200 milliliters of water and the mixture stirred. The acid dissolves slowly. To the resulting solution is added a solution of 59 grams of tetra-n-butylphosphonium chloride in about 200 milliliters of distilled water. The reaction mixture is stirred for half an hour and is then extracted with two 250-milliliter portions of chloroform. The extract is dried over anhydrous $Na_2SO_4$ and the chloroform is then distilled. A light-brown viscous liquid remains. It is dried overnight at 80° C. On cooling, tetra-n-butylphosphonium diphenylphosphinate separates as white crystals. It is collected by filtration and is washed with anhydrous ether; the crystals melt at 83° to 84° C.

Xylenesulfonate

A mixture of 370 grams of sodium xylenesulfonate in 1 liter of water is stirred and heated until the sulfonate is dissolved, then 500 grams of tetra-n-butylphosphonium chloride is added. After complete dissolution of the chloride, the reaction mixture is cooled and the phosphonium sulfonate separates as a light yellow viscous liquid. It is dried at <100 torr and 60° C. overnight.

Other phosphonium salts used in the examples are commercially available.

EXAMPLE 1

This example illustrates the use of a phosphonium acetate to improve the conductivity of an N-alkyl polycarbonamide.

Tetra-n-butylphosphonium acetate is mixed with a polymer of N,N'-diethylhexamethylene diamine and adipic acid end-capped with 23 mole % of stearic acid and having a number average molecular weight of 1930. The salt is incorporated into the polymer by mixing with the molten polymer at 100° C. The mixture is dried for 2 to 3 hours at 100° C in a vacuum oven at a pressure of less than 50 torr and a composition that is syrupy at 25° C is obtained. The polymer containing 4.4 mole percent of the phosphonium salt has a log $R_s$ of 5.9. Without the phosphonium salt is has a log $R_s$ of 8.5.

EXAMPLE 2

This example illustrates the use of tetra-n-butylphosphonium diphenylphosphinate to improve the conductivity of an N-alkyl polycarbonamide.

In Run I an autoclave is charged with 3200 grams of the salt of N,N'-diethylhexamethylene diamine and dodecanedioic acid, 78 grams of N,N-diethylhexamethylene diamine, 200 grams of water, 7 grams of boric acid (catalyst), 20 grams of formic acid to reduce diamine loss, 4.5 grams of potassium phenylphosphinate (catalyst and antioxidant), 30 grams of bis(hexamethylene)triamine (branching agent, used to increase molecular weight) and 320 grams of tetra-n-butylphosphonium diphenylphosphinate. The autoclave is purged with nitrogen and heated at 215° C. for 3 hours at a pressure not greater than 300 pounds per square inch (21.1 kilograms per square centimeter) gage with an agitator speed of 6 to 8 rpm. The pressure is reduced to atmospheric and the temperature is raised to 295° C over a period of 60 minutes. The pressure is then reduced to less than 10 torr over a 30-minute period and is held there for 3 hours. The pressure is brought to atmospheric with nitrogen and the polymer is extruded at 220° C under a blanket of nitrogen. The polymer is gummy at 25° C. The polymer contains 8 mole percent of the phosphonium salt, has a relative viscosity of 12.1 and has 146.7 carboxyl and 166.3 amine end-groups in microequivalents per gram of polymer. The polymer has a log $R_s$ of 6.7 which remains unchanged after boiling in water for 2 hours. The corresponding polymer which does not contain phosphonium salt generally has a log $R_s$ of 8.8 to 9.0.

In two separate additional runs, Runs II and III, an autoclave is charged with 2414 grams of N,N'-diethylhexamethylene diamine and dodecanedioic acid salt, 51.6 grams of N,N'-diethylhexamethylene diamine, 5 grams of boric acid, 16 grams of formic acid, and 4 grams of potassium phenylphosphinate. The autoclave is purged with nitrogen and heated at 215° C for 2 hours under 150 pounds per square inch (10.5 kilograms per square centimeter) gage with an agitator speed of 6 to 8 rpm. The autoclave pressure is reduced to atmospheric and the temperature raised to 230° C. A slow bleed of nitrogen is established for 30 minutes. The phosphonium salt is added in molten form at about 120° C through a closed pressure hopper. The batch temperature is raised to 300° C and the batch is held under a pressure of less than 2 torr for 2 hours. The agitator is turned off and the pressure is brought to atmospheric with nitrogen. The polymer is extruded at 280° C. under a blanket of nitrogen. Table I lists data from the batches made by this procedure.

TABLE I

| Run | Salt Conc., Wgt. % | Log $R_s$ | Relative Viscosity |
|---|---|---|---|
| II | 5.4 | 6.9 | 66.2 |
| III | 10.2 | 6.7 | 42.5 |

EXAMPLE 3

This example illustrates the use of tetra-n-butylphosphonium phenylphosphinate to improve the conductivity of an N-alkyl polycarbonamide.

Polymer is prepared as described in Run I of Example 2 except that 300 grams of tetra-n-butylphosphonium phenylphosphinate is used and no bis(hexamethylene)-triamine is used. The polymer of this example is gummy at 25° C and has a log $R_s$ of 6.9 which changed to 7.2 after boiling in water for three hours and drying. It has 9.3 wgt. % of the phosphonium salt and an inherent viscosity of 0.72.

In a similar polymerization using 23.8 mole percent of the above phosphonium salt, the resulting composition has a log $R_s$ of 6.5. The polymer without the phosphonium salt has a log $R_s$ of 8.8.

EXAMPLE 4

This example illustrates the use of tetra-n-butylphosphonium diphenylphosphinate to improve the conductivity of a polyether-ester. The polyetherester is prepared from 218 grams of dodecanedioic acid, 200 grams of polyethylene glycol of 200 average molecular weight, 6.6 grams of pyromellitic dianhydride (branching agent), and 0.4 gram of p-toluene-sulfonic acid (catalyst). These ingredients are combined in a 500-milliliter flask fitted with a steam-jacketed, reflux condenser and a take-off condenser. The mixture is purged with nitrogen and is heated at 250° C. for 2 hours under an atmosphere of nitrogen. It is then heated at 250° C. for 1.5 hours at a pressure of 0.02 to 0.5 torr. In 5 separate runs, the phosphonium salt is mixed with the polymer at 100° C., and the mixture is dried overnight at 100° C. in a vacuum oven. The phosphonium salt dissolved completely in the polymer. The amount of phosphonium salt used and the conductivity of the polymer is shown in Table II.

TABLE II

| Run | Phosphonium Salt, Wgt. % | Log $R_s$ | Polymer Nature at ~ 25° C. |
|---|---|---|---|
| I | 1.0 | 6.88 | Syrupy |
| II | 2.0 | 6.54 | Syrupy |
| III | 2.9 | 6.36 | Syrupy |
| IV | 4.8 | 6.00 | Syrupy |
| V | 9.1 | 5.54 | Syrupy |
| — | 0 | 8.1 | Syrupy |

EXAMPLE 5

This example illustrates the use of tetra-n-butyl-phosphonium xylenesulfonate to improve the conductivity of an aliphatic polyester.

A still is charged with 11,700 grams of dimethyl azelate, 2250 grams of 2,2-dimethyl-1,3-propanediol, 1360 grams of tetra-n-butylphosphonium xylenesulfonate, 100 grams of 2-ethyl-2-hydroxymethyl-1,3-propanediol, 4 grams of sodium acetate trihydrate, 11.2 grams of manganese acetate tetrahydrate, 7.7 grams of antimony oxide, and 6200 grams of ethylene glycol. The temperature of the still is raised to 230° C. and about 2700 grams of methanol and about 1000 grams of ethylene glycol are removed by distillation. The batch is then transferred to an autoclave at 230° C. which has been purged with nitrogen and 8.3 ml. of 85%, by weight, phosphoric acid is added. The autoclave is equipped with an agitator which is operated at 30 rpm. The pressure is reduced to less than 2 torr for 4-5 hours at 270° C. The pressure is then brought to 3.9 kilograms per square centimeter gage with helium and the polymer extruded under a blanket of nitrogen. The polyester contains 10 wgt. % of the phosphonium salt, has an inherent viscosity of 0.87, a log $R_s$ of 5.8 and is gummy at 25° C.

EXAMPLE 6

The tetra-n-butylphosphonium diphenylphosphinate modified polymer of N,N'-diethylhexamethylene diamine and dodecanedioic acid prepared in Run II of Example 2 is spun as the core in carpet fibers using a 10-hole spinneret for spinning a sheath-core yarn. The sheath is poly(hexamethylene adipamide) having a relative viscosity of about 45. Each yarn is drawn 3.2X giving drawn filaments having a denier of 10. Two runs are made with the percent core shown in Table III.

Twenty-four yarns from each run are plied and then bulked using a hot-air jet. A tufted carpet is prepared from each plied yarn on cotton duck with a pile height of 1.42 cm and 0.48 cm gage with approximately 3.54 stitches per cm.

The carpets are mock-dyed according to the following procedure: The carpet is first scoured in a bath of cold water containing 0.01% of trisodium phosphate and 0.01% surfactant, by weight. The temperature of the bath is raised to 76.7° C. at a rate of about 1.7° C. per minute and held for 30 minutes. The carpet is rinsed with cold water for 10 minutes. The carpet is then placed in a mock-dye bath at 26.7° C. having a pH of 5.9–6.0. The bath temperature is raised to 97.8° C. at a rate of about 1.7° C. per minute and held for 60 minutes. The carpet is rinsed in cold water for 10 minutes and dried at 121° C. It is hand latexed and dried at 121° C.

The static propensity of the carpet is tested at 21° C. and 20% relative humidity by AATCC Test Method 134—1969 with changes as adopted by the Carpet and Rug Institute, September, 1971. Results are given in Table II.

TABLE III

| Yarn | Core, % | Carpet Static Propensity Kilovolts |
|---|---|---|
| Sheath-Core | 15.2 | 2.9 |
| Sheath-Core | 32.7 | 2.4 |
| Control* | 0.0 | 10.8 |

*Unmodified poly(hexamethylene adipamide) yarn

EXAMPLE 7

The composition of Example 3 containing 9.3% of tetra-n-butylphosphonium phenylphosphinate (log $R_s$ of 7.2) is spun as 2.5% core in a 10-filament, trilobal yarn. The polymer of the sheath is prepared from the salt of bis(4-aminocyclohexyl)methane (containing about 70% of the trans-trans stereoisomer) and dodecanedioic acid. The yarn is drawn to a denier of 30. Two of the drawn yarns are plied and the plied yarns woven as the filling in a fabric. The log rho results of these conductive filaments after scouring, bleaching, and followed by 50 "C" washes are given in Table IV.

TABLE IV

| Yarn | Core | Log $R_s$ | Log Rho |
|---|---|---|---|
| Sheath-Core | Conductive Polymer + 8.6% Phosphonium Salt | 7.1 | 9.4 |
| Sheath-Core | Conductive Polymer Alone | 8.8–9.0 | 10.4 |
| Control | None | — | >13.0 |

EXAMPLE 8

The composition prepared in Run I of Example 2 is spun as 3.4% core as in Example 6 using the sheath polymer of that example. The yarn is woven as the filling in a fabric. The log rho data is given in Table V.

TABLE V

| Core | Log $R_s$ | Fabric Log Rho After "C" Washes | | |
|---|---|---|---|---|
| | | 1 | 10 | 30 |
| Run I, Ex. 2 | 6.9 | 10.0 | 10.0 | 10.2 |
| None | — | — | 13.0 | — |

EXAMPLE 9

The antistatic composition of Example 5 is spun as a 2% core in the filaments of a 34-filament yarn with the filaments having a round cross-section. The polymer of the sheath is the same as the sheath polymer of Example 6. The yarn is drawn to a denier of 102 and woven as the filling in a fabric. The filament log rho is found to be 9.3.

What is claimed is:

1. An antistatic composition having a log $R_s$ of less than 8 and consisting essentially of an N-alkylpolycarbonamide having a Tg (NMR) of less than 25° C and from 0.02 to 35 weight percent based on the weight of the composition of a phosphonium salt of the formula $$[R_1R_2R_3R_4P^+]_n \ X^{n-}$$

where $R_1 R_2 R_3$ and $R_4$ each represents a monovalent hydrocarbon group of from 1–18 carbon atoms; $X^{n-}$ is an organic anion selected from the group of

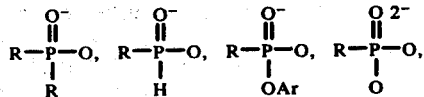

and $R(SO_3^-)_m$ wherein Ar is an aromatic hydrocarbon radical; R is an aliphatic or an aromatic hydrocarbon radical; $m$ is 1 or 2; and $n$, the valence of the anion, is 1 or 2.

2. The composition of claim 1 wherein the phosphonium salt is a phosphonium aryl sulfonate.

3. The composition of claim 1 wherein the phosphonium salt is tetra-n-butyl phosphonium phenylphosphinate.

4. The composition of claim 1 wherein the phosphonium salt is tetra-n-butyl phosphonium diphenyl phosphinate.

* * * * *